United States Patent
Yang et al.

(10) Patent No.: US 10,374,780 B2
(45) Date of Patent: Aug. 6, 2019

(54) METHOD AND DEVICE FOR INDICATING NUMBER OF BITS

(71) Applicant: ZTE Corporation, Shenzhen (CN)

(72) Inventors: Jin Yang, Shenzhen (CN); Yu Ngok Li, Shenzhen (CN); Shuanshuan Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 40 days.

(21) Appl. No.: 15/514,602

(22) PCT Filed: Jun. 4, 2015

(86) PCT No.: PCT/CN2015/080810
§ 371 (c)(1),
(2) Date: Mar. 27, 2017

(87) PCT Pub. No.: WO2016/045409
PCT Pub. Date: Mar. 31, 2016

(65) Prior Publication Data
US 2017/0230165 A1    Aug. 10, 2017

(30) Foreign Application Priority Data
Sep. 25, 2014    (CN) .......................... 2014 1 0498693

(51) Int. Cl.
*H04W 76/14* (2018.01)
*H04L 5/00* (2006.01)
(Continued)

(52) U.S. Cl.
CPC ............. *H04L 5/0094* (2013.01); *H04W 8/14* (2013.01); *H04W 72/0446* (2013.01); *H04W 76/14* (2018.02)

(58) Field of Classification Search
CPC ... H04W 76/14; H04W 8/14; H04W 72/0446; H04L 5/0094
See application file for complete search history.

(56) References Cited

U.S. PATENT DOCUMENTS

2013/0170435 A1*   7/2013   Dinan .................... H04L 45/50
                                                                370/328
2014/0112194 A1    4/2014   Novlan
(Continued)

FOREIGN PATENT DOCUMENTS

| CN | 102026209 A | 4/2011 |
| CN | 103731245 A | 4/2014 |
| CN | 103997788 A | 8/2014 |

OTHER PUBLICATIONS

International Search Report for corresponding application No. PCT/CN2015/080810 filed on Jun. 4, 2015; dated Jul. 29, 2015.
(Continued)

*Primary Examiner* — Wei Zhao
(74) *Attorney, Agent, or Firm* — Cantor Colburn LLP

(57) ABSTRACT

A method and device for indicating the number of bits are provided. In the method, a transmitting User Equipment (UE) and/or a network entity indicate the number k of effective indication bits in a bitmap sequence, the bitmap sequence indicates Physical Sidelink Shared Channel (PSSCH) subframes allocation, k includes one or multiple values, $1 \leq k \leq N$, and N is a bit length of the entire bitmap sequence.

17 Claims, 4 Drawing Sheets

A transmitter UE and/or a network entity indicate the number k of effective indication bits in a bitmap sequence, whereIn the bitmap sequence indicates PSSCH subframe allocation, k includes one or multiple values, $1 \leq k \leq N$, and N is a bit length of the entire bitmap sequence — S502

(51) Int. Cl.
*H04W 8/14* (2009.01)
*H04W 72/04* (2009.01)

(56) References Cited

U.S. PATENT DOCUMENTS

2017/0041932 A1* 2/2017 Chae ............... H04W 72/04
2017/0181206 A1* 6/2017 Lee ................. H04W 76/14
2017/0295601 A1* 10/2017 Kim ................. H04W 72/04

OTHER PUBLICATIONS

3GPP WG RAN1:: "3GPP TSG RAN #65: R1-142872: Work Plan Related Evaluation", vol. TSG RAN, No. Edinburgh, GB, Sep. 9, 2014-Sep. 12, 2014, Sep. 12, 2014, XP050785085.
A. Roessler, et al., "LTE-Advanced (3GPP Rel. 12) Technology Introduction White Paper Table of Contents", Aug. 4, 2015, pp. 1-60, XP055391434.
European Search Report for corresponding application EP 15 844 309.3; dated Jul. 31, 2017.
Intel Corporation: "3GPP TSG RAN WG1 #78: R1-142872: Resource Allocation for Mode-1 D2D Operation", vol. RAN WG1, No. Dresden, Germany, Aug. 18, 2014-Aug. 24, 2014, Aug. 17, 2014, XP050788356.
Intel Corporation: "3GPP TSG RAN WG1 #80: R1-150235:Discussion on Time Resource Pattern of Transmission", vol. RAN WG1, No. Athens Greece, Feb. 9, 2015-Feb. 13, 2015, Jan. 31, 2015, XP050948905.
J Schleinz, et al: "Device to Device Communication in LTE Whitepaper D2D Communication-1MA264-Oe", Sep. 29, 2015, XP055232153.
Samsung: "3GPP Draft R1-143456; WF on T-RPT Design", 3rd Generation Partnership Project, Aug. 21, 2014, XP050788975, Internet: URL: http://www.3gpp.org/ftp/Meetings_3GPP_SYNC/RAN1/Docs/.

* cited by examiner

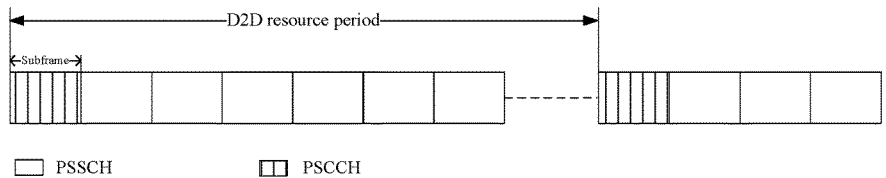

Fig. 4

A transmitter UE and/or a network entity indicate the number k of effective indication bits in a bitmap sequence, wherein the bitmap sequence indicates PSSCH subframe allocation, k includes one or multiple values, $1 \leq k \leq N$, and N is a bit length of the entire bitmap sequence  ⎯ S502

Fig. 5

First device 60 for indicating the number of bits

First indicating module 62

Fig. 6

Second device 70 for indicating the number of bits

Second indicating module 72

Fig. 7

METHOD AND DEVICE FOR INDICATING NUMBER OF BITS

TECHNICAL FIELD

The present disclosure relates to the field of communication and, more particularly, to a method and device for indicating the number of bits.

BACKGROUND

In a Device-to-Device (D2D) communication system, when a service between the User Equipment (UE) is required to be transmitted, service data between the UEs is not forwarded by the base station, but is transmitted directly from the data source UE to the target UE via an air interface as shown in FIG. 1. FIG. 1 is a structure block diagram of the D2D communication in the related art. This communication mode has the characteristics distinct from a conventional cellular system communication mode. For near field communication users who can use the D2D communication mode, D2D transmission not only saves the wireless spectrum resources, but also reduces the data transmission pressure of the core network. The D2D transmission can reduce the system resource occupancy, increase the spectral efficiency of the cellular communication system, reduce the terminal transmission power consumption, and save network operation costs to a large extent.

In a conventional cellular communication system, the radio resources of the UE are controlled and scheduled uniformly by the evolved NodeB (eNB). The eNB indicates the UE of configured downlink or uplink resources by the Physical Downlink Control Channel (PDCCH). The UE receives data signals transmitted by the eNB on the corresponding downlink resource according to the eNB configuration indication or transmits signals to the eNB on the uplink resource.

In a Long-Term Evolution (LTE) system, the radio resource is divided in units of radio frames in the time domain. Each radio frame is 10 ms and contains 10 subframes. Each subframe is 1 ms and is divided into two slots of 0.5 ms, as shown in FIG. 2, which is a structure block diagram of the LTE system frame in the related art.

In cellular communication, an eNB schedules and indicates, to UE, on the PDCCH resource of the downlink subframe #n, the Physical Downlink Shared Channel (PDSCH) resource configured in the current subframe. FIG. 3 is an indication diagram of the LTE system resource scheduling in the related art. The UE receives the indication information in the PDCCH, and receives the Transport Block (TB) on the corresponding Resource Block (RB) in the subframe #n according to the indication information to obtain the data transmitted by the eNB, as shown in FIG. 3. FIG. 4 is an indication diagram of the D2D communication resource scheduling in the related art. In the D2D communication system, data is directly transmitted between the UEs. The transmitter UE needs to transmit the D2D control information and indicates, to the receiver UE, the resources and other related information used by the transmitted data signal. Due to the particularity of D2D communication, the transmitter UE transmits D2D data according to the scheduling of eNB or by selecting one or more Physical Sidelink Shared Channel (PSSCH) in an valid resource pool, and indicates the used PSSCH subframe and the associated control information in the D2D link (also referred to as Sidelink) Control Information (Sidelink Control Information (SCI)) signaling. The bitmap sequence corresponding to the PSSCH subframe configuration is indicated by a Time Resource Pattern (TRP) information. The bit labelled as "1" in the indicated bitmap sequence indicates that the corresponding subframe is a PSSCH subframe. The bitmap sequence is used for mapping circularly in the cycle to achieve the configuration indication of the PSSCH subframe during the entire cycle. Due to the fixed bitmap sequence length and the limited TRP indication overhead, the flexibility of the D2D PSSCH subframe configuration is limited.

There is no valid solution for low flexibility of the D2D PSSCH subframe configuration in the related art.

SUMMARY

Some embodiments of the present disclosure provide a method or device for indicating the number of bits to solve at least the problem of low flexibility of the D2D PSSCH subframe configuration in the related art.

According to an aspect of the embodiments of the present disclosure, there is provided a method for indicating the number of bits. In the method for indicating the number of bits, a transmitter UE and/or a network entity indicate the number k of effective indication bits in a bitmap sequence. In the embodiment, the bitmap sequence indicates PSSCH subframes allocation k includes one or multiple values, $1 \leq k \leq N$, and N is a bit length of the entire bitmap sequence.

In the embodiment of the present disclosure, the transmitter UE and/or the network entity may indicate the number k of the effective indication bits in the following manner. The network entity and/or the transmitter UE may indicate the number k of the effective indication bits via a high layer signaling and/or a physical layer signaling.

In the embodiment of the present disclosure, the transmitter UE and/or the network entity may indicate the number k of the effective indication bits via the high layer signaling and/or the physical layer signaling according to at least one of the following manners. The UE indicates the number k of the effective indication bits via a broadcast message for D2D communication. The UE indicates the number k of the effective indication bits via a SCI between a transmitter terminal and a receiver terminal of D2D communication. The network entity indicates the number k of the effective indication bits via a System Information Block (SIB). The network entity indicates the number k of the effective indication bits via a Radio Resource Control (RRC) message. The network entity indicates the number k of the effective indication bits via a sidelink resource scheduling control signaling.

In the embodiment of the present disclosure, the transmitter UE and/or the network entity may indicate the number k of the effective indication bits via a high layer signaling and/or a physical layer signaling in at least one of the following manners. When the UE indicates the number k of the effective indication bits via the broadcast message for D2D communication, one or multiple k values are indicated by the broadcast message which is carried on a PSBCH resource. When the UE indicates the number k of the effective indication bits via the SCI between the transmitter terminal and the receiver terminal of D2D communication, one or multiple k values are indicated by n bits in the SCI, where n is equal to 1 or 2 or 3. When the UE indicates the number k of the effective indication bits via the SCI, one k value is indicated by n1 bits in indication bits corresponding to a TRP, and a bitmap pattern is indicated by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7. When the network entity indicates the number k of the effective indication bits via the SIB, one or multiple k values, which are indicated via the SIB, are effective for all D2D UEs within a cell. When the network entity indicates the number k of the effective indication bits via the SIB, one or multiple k values, which are indicated via the SIB, are effective for UEs within a designated D2D group. When the network entity indicates the number k of the effective indication bits via the RRC message, one or multiple k values are indicated by the RRC message which is embodied as a D2D reconfiguration message of a D2D-specific configuration indication message. When the network entity indicates the number k of the effective indication bits in the sidelink resource scheduling control signaling, one or multiple k values are indicated by n bits contained in the sidelink resource scheduling control signaling in a Downlink Control Information (DCI) format, where n is equal to 1 or 2 or 3. When the network entity indicates the number k of the effective indication bits via DCI, the network entity indicates one k value by n1 bits in the indication bits corresponding to a TRP, and indicates a bitmap pattern by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In the embodiment of the present disclosure, a TRP indicates a bitmap pattern through a 7-bit index, each of TRP indexes corresponds to one bitmap pattern, and the TRP indexes indicate all or part of bitmap patterns corresponding to one or multiple k values.

In the embodiment of the present disclosure, the TRP indexes sequentially indicate all or part of the bitmaps corresponding to different k values in accordance with the multiple k values when the TRP indexes indicate all or part of the bitmaps corresponding to the multiple k values.

In the embodiment of the present disclosure, the network entity includes at least one of: an eNB, a Relay Station (RN), a Multi-cell/multicast Coordination Entity (MCE), a Gateway (GW), a Mobility Management Equipment (MME), an Evolved Universal Terrestrial Radio Access Network (EU-TRAN), and an Operation Administration Maintenance (OAM) manager.

According to another aspect of the embodiments of the present disclosure, there is provided a device for indicating the number of bits, applied to a transmitter UE side and including a first indicating module. The first indicating module is arranged to indicate the number k of effective indication bits in a bitmap sequence. In the embodiment, the bitmap sequence indicates PSSCH subframes allocation, k includes one or multiple values, $1 \leq k \leq N$, and N is a bit length of the entire bitmap sequence.

In the embodiment of the present disclosure, the first indicating module is arranged to indicate the number k of the effective indication bits via a high layer signaling and/or a physical layer signaling.

In the embodiment of the present disclosure, the first indicating module is arranged to indicate the number k of the effective indication bits in at least one of the following manners. The UE indicates the number k of the effective indication bits via a broadcast message for D2D communication. The UE indicates the number k of the effective indication bits via a SCI between a transmitter terminal and a receiver terminal of D2D communication.

In the embodiment of the present disclosure, the first indicating module is further arranged to execute at least one of the following processing. When the UE indicates the number k of the effective indication bits via the broadcast message for D2D communication, one or multiple k values are indicated by the broadcast message which is carried on a PSBCH resource. When the UE indicates the number k of the effective indication bits via the SCI between the transmitter terminal and the receiver terminal of D2D communication, one or multiple k values are indicated by n bits in the SCI, where n is equal to 1 or 2 or 3. When the UE indicates the number k of the effective indication bits via the SCI, one k value is indicated by n1 bits in indication bits corresponding to a TRP, and a bitmap pattern is indicated by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In the embodiment of the present disclosure, a TRP indicates a bitmap pattern through a 7-bit index, each of TRP indexes corresponds to one bitmap pattern, and the TRP indexes indicate all or part of bitmap patterns corresponding to one or multiple k values.

In the embodiment of the present disclosure, the TRP indexes sequentially indicate all or part of the bitmaps corresponding to different k values in accordance with the multiple k values when the TRP indexes indicate all or part of the bitmaps corresponding to the multiple k values.

According to still another aspect of the embodiments of the present disclosure, there is provided a device for indicating the number of bits, applied to a network entity side and including a second indicating module. The second indicating module is arranged to indicate the number k of effective indication bits in a bitmap sequence. In the embodiment, the bitmap sequence indicates PSSCH subframes allocation, k includes one or multiple values, $1 \leq k \leq N$, and N is a bit length of the entire bitmap sequence.

In the embodiment of the present disclosure, the second indicating module is arranged to indicate the number k of the effective indication bits via a high layer signaling and/or a physical layer signaling.

In the embodiment of the present disclosure, the second indicating module is arranged to indicate the number k of the effective indication bits in at least one of the following manners. The network entity indicates the number k of the effective indication bits via a SIB. The network entity indicates the number k of the effective indication bits via a RRC message. The network entity indicates the number k of the effective indication bits via a sidelink resource scheduling control signaling.

In the embodiment of the present disclosure, the second indicating module is further arranged to execute at least one of the following processing. When the network entity indicates the number k of the effective indication bits via the SIB, one or multiple k values, which are indicated via the SIB, are effective for all D2D UEs within a cell. When the network entity indicates the number k of the effective indication bits via the SIB, one or multiple k values, which are indicated via the SIB, are effective for UEs within a designated D2D group. When the network entity indicates the number k of the effective indication bits via the RRC message, one or multiple k values are indicated by the RRC message which is embodied as a D2D reconfiguration message of a D2D-specific configuration indication message. When the network entity indicates the number k of the effective indication bits in the sidelink resource scheduling control signaling, one or multiple k values are indicated by n bits contained in the sidelink resource scheduling control signaling in a DCI format, where n is equal to 1 or 2 or 3. When the network entity indicates the number k of the effective indication bits via DCI, the network entity indicates one k value by n1 bits in the indication bits corresponding to a TRP, and indicates a bitmap pattern by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In the embodiment of the present disclosure, a TRP indicates a bitmap pattern through a 7-bit index, each of TRP indexes corresponds to one bitmap pattern, and the TRP indexes indicate all or part of bitmap patterns corresponding to one or multiple k values.

In the embodiment of the present disclosure, the TRP indexes sequentially indicate all or part of the bitmaps corresponding to different k values in accordance with the multiple k values when the TRP indexes indicate all or part of the bitmaps corresponding to the multiple k values.

In the embodiment of the present disclosure, the network entity includes at least one of: an eNB, a RN, a MCE, a GW, a MME, an EUTRAN, and an OAM manager.

According to still another aspect of the embodiments of the present disclosure, there is provided a device for indicating the number of bits, applied to a system. The system includes a transmitter UE and a network entity. The transmitter UE and the network entity are arranged to indicate the number k of effective indication bits in a bitmap sequence. In the embodiment, the bitmap sequence indicates PSSCH subframes allocation, k includes one or multiple values, $1 \leq k \leq N$, and N is a bit length of the entire bitmap sequence.

In the embodiment of the present disclosure, the transmitter UE and the network entity are arranged to indicate the number k of the effective indication bits via a high layer signaling and/or a physical layer signaling.

In the embodiment of the present disclosure, the transmitter UE and the network entity are arranged to indicate the number k of the effective indication bits via a high layer signaling and a physical layer signaling in at least one of the following manners. The network entity indicates the number k of the effective indication bits via a SIB, and the UE indicates the number k of the effective indication bits via a broadcast message for D2D communication. The network entity indicates the number k of the effective indication bits via the SIB, and the UE indicates the number k of the effective indication bits via a Sidelink Control Information (SCI) between a transmitter terminal and a receiver terminal of D2D communication. The network entity indicates the number k of the effective indication bits via a RRC message, and the UE indicates the number k of the effective indication bits via a broadcast message for D2D communication. The network entity indicates the number k of the effective indication bits via the RRC message, and the UE indicates the number k of the effective indication bits via the SCI. The network entity indicates the number k of the effective indication bits via a sidelink resource scheduling control signaling, and the UE indicates the number k of the effective indication bits via a broadcast message for D2D communication. The network entity indicates the number k of the effective indication bits via the sidelink resource scheduling control signaling, and the UE indicates the number k of the effective indication bits via the SCI.

In the embodiment of the present disclosure, the device is arranged to execute at least one of the following processing.

When the UE indicates the number k of the effective indication bits via the broadcast message for D2D communication, one or multiple k values are indicated by the broadcast message which is carried on a PSBCH resource. When the UE indicates the number k of the effective indication bits via the SCI between the transmitter terminal and the receiver terminal of D2D communication, one or multiple k values are indicated by n bits in the SCI, where n is equal to 1 or 2 or 3. When the UE indicates the number k of the effective indication bits via the SCI, one k value is indicated by n1 bits in indication bits corresponding to a TRP, and a bitmap pattern is indicated by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7. When the network entity indicates the number k of the effective indication bits via the SIB, one or multiple k values, which are indicated via the SIB, are effective for all D2D UEs within a cell. When the network entity indicates the number k of the effective indication bits via the SIB, one or multiple k values, which are indicated via the SIB, are effective for UEs within a designated D2D group. When the network entity indicates the number k of the effective indication bits via the RRC message, one or multiple k values are indicated by the RRC message which is embodied as a D2D reconfiguration message of a D2D-specific configuration indication message. When the network entity indicates the number k of the effective indication bits in the sidelink resource scheduling control signaling, one or multiple k values are indicated by n bits contained in the sidelink resource scheduling control signaling in a DCI format, where n is equal to 1 or 2 or 3. When the network entity indicates the number k of the effective indication bits via DCI, the network entity indicates one k value by n1 bits in the indication bits corresponding to a TRP, and indicates a bitmap pattern by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In the embodiment of the present disclosure, a TRP indicates a bitmap pattern through a 7-bit index, each of TRP indexes corresponds to one bitmap pattern, and the TRP indexes indicate all or part of bitmap patterns corresponding to one or multiple k values.

In the embodiment of the present disclosure, the TRP indexes sequentially indicate all or part of the bitmaps corresponding to different k values in accordance with the multiple k values when the TRP indexes indicate all or part of the bitmaps corresponding to the multiple k values.

In the embodiment of the present disclosure, the network entity includes at least one of: an eNB, a RN, a MCE, a GW, a MME, an EUTRAN, and an OAM manager.

According to the embodiments of the present disclosure, the transmitter UE and/or the network entity indicate the number k of effective indication bits in a bitmap sequence. The bitmap sequence indicates PSSCH subframes allocation, k includes one or multiple values, $1 \leq k \leq N$, and N is a bit length of the entire bitmap sequence. This technical scheme solves the problem in the related art of low flexibility in D2D PSSCH subframe configuration. By virtue of the technical scheme, the effect of increased flexibility of D2D PSSCH subframe configuration and increased resource utilization rate can be achieved.

BRIEF DESCRIPTION OF THE DRAWINGS

The drawings are described here to provide further understanding of the present disclosure, and form a part of the present disclosure. The schematic embodiments and description of the present disclosure are adopted to explain the present disclosure, and do not form limits to the present disclosure. In the drawings:

FIG. 4 is an indication diagram of the D2D communication resource scheduling in the related art;

FIG. 5 is a flow diagram of a method for indicating the number of bits according to an embodiment of the present disclosure;

FIG. 6 is a structure block diagram of the first device for indicating the number of bits according to an embodiment of the present disclosure;

FIG. 7 is a structure block diagram of the second device for indicating the number of bits according to an embodiment of the present disclosure;

DETAILED DESCRIPTION OF THE EMBODIMENTS

Figure 1:
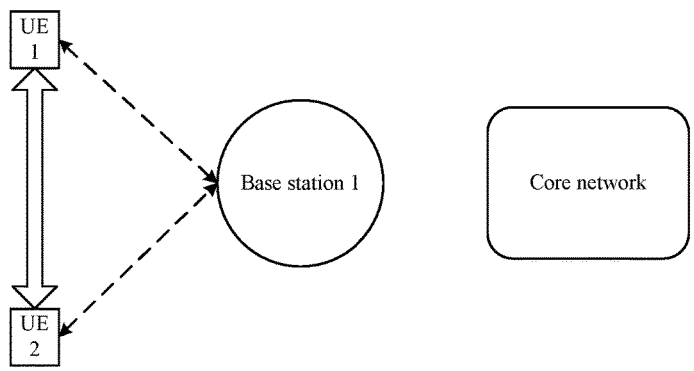
FIG. 1 is a structure block diagram of the D2D communication in the related art.
Figure 2:
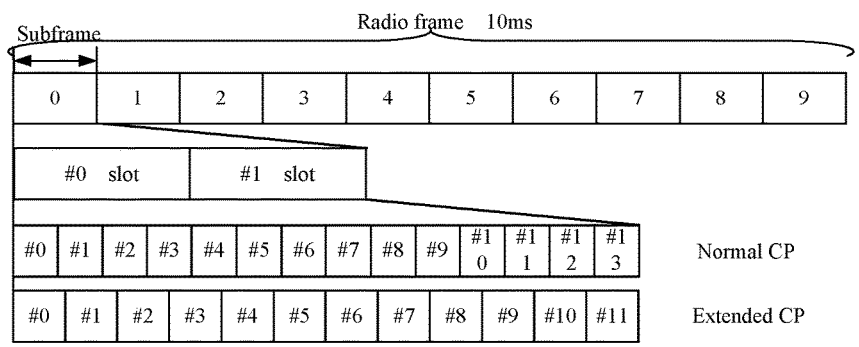
FIG. 2 is a structure block diagram of the LTE system frame in the related art.
Figure 3:
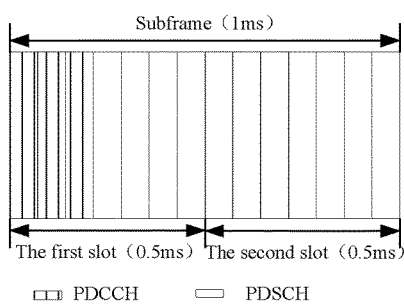
FIG. 3 is an indication diagram of the LTE system resource scheduling in the related art.

The present disclosure is described below with reference to the drawings and the embodiments in detail. It is important to note that the embodiments of the present disclosure and the characteristics in the embodiments may be combined under the condition of no conflicts.

In an embodiment, there is provided a method for indicating the number of bits. FIG. 5 is a flow diagram of a method for indicating the number of bits according to an embodiment of the present disclosure. As shown in FIG. 5, the flow includes the following step.

At Step S502, the transmitter UE and/or the network entity indicate the number k of effective indication bits in a bitmap sequence. In this embodiment, the bitmap sequence indicates PSSCH subframes allocation, k includes one or multiple values, $1 \le k \le N$, and N is a bit length of the entire bitmap sequence.

By means of the above steps, a method is used in which the transmitter UE and/or the network entity indicate the number k of effective indication bits in a bitmap sequence. In the embodiment, the bitmap sequence indicates PSSCH subframes allocation, k includes one or multiple values, $1 \le k \le N$, and N is a bit length of the entire bitmap sequence. This technical scheme solves the problem in the related art of low flexibility in D2D PSSCH subframe configuration. By virtue of the technical scheme, the effect of increased flexibility of D2D PSSCH subframe configuration and increased resource utilization rate can be achieved.

In an exemplary embodiment, the transmitter UE and/or the network entity may indicate the number k of the effective indication bits in the following manner. The network entity and/or the transmitter UE indicate the number k of the effective indication bits via a high layer signaling and/or a physical layer signaling.

In some exemplary embodiments, the transmitter UE and/or the network entity may indicate the number k of the effective indication bits via the high layer signaling and/or the physical layer signaling in at least one of the following manners. The UE indicates the number k of the effective indication bits via a broadcast message for D2D communication. The UE indicates the number k of the effective indication bits via a SCI between a transmitter terminal and a receiver terminal of D2D communication. The network entity indicates the number k of the effective indication bits via a System Information Block (SIB). The network entity indicates the number k of the effective indication bits via a Radio Resource Control (RRC) message. The network entity indicates the number k of the effective indication bits via a sidelink resource scheduling control signaling.

In exemplary embodiments of the present disclosure, the transmitter UE and/or the network entity may indicate the number k of the effective indication bits via a high layer signaling and/or a physical layer signaling in at least one of the following manners. When the UE indicates the number k of the effective indication bits via the broadcast message for D2D communication, one or multiple k values are indicated by the broadcast message which is carried on a PSBCH resource. When the UE indicates the number k of the effective indication bits via the SCI between the transmitter terminal and the receiver terminal of D2D communication, one or multiple k values are indicated by n bits in the SCI, where n is equal to 1 or 2 or 3. When the UE indicates the number k of the effective indication bits via the SCI, one k value is indicated by n1 bits in indication bits corresponding to a TRP, and a bitmap pattern is indicated by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7. When the network entity indicates the number k of the effective indication bits via the SIB, one or multiple k values, which are indicated via the SIB, are effective for all D2D UEs within a cell. When the network entity indicates the number k of the effective indication bits via the SIB, one or multiple k values, which are indicated via the SIB, are effective for UEs within a designated D2D group. When the network entity indicates the number k of the effective indication bits via the RRC message, one or multiple k values are indicated by the RRC message which is embodied as a D2D reconfiguration message of a D2D-specific configuration indication message. When the network entity indicates the number k of the effective indication bits in the sidelink resource scheduling control signaling, one or multiple k values are indicated by n bits contained in the sidelink resource scheduling control signaling in a Downlink Control Information (DCI) format, where n is equal to 1 or 2 or 3. When the network entity indicates the number k of the effective indication bits via DCI, the network entity indicates one k value by n1 bits in the indication bits corresponding to a TRP, and indicates a bitmap pattern by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In an exemplary embodiment, a TRP indicates a bitmap pattern through a 7-bit index. Each of TRP indexes corresponds to one bitmap pattern. The TRP indexes indicate all or part of bitmap patterns corresponding to one or multiple k values.

The TRP indexes sequentially indicate all or part of the bitmaps corresponding to different k values in accordance with the multiple k values when the TRP indexes indicate all or part of the bitmaps corresponding to the multiple k values.

The network entity may include at least one of: an eNB, a RN, a MCE, a GW, a MME, an EUTRAN, and an OAM manager.

In another embodiment, there is also provided a device for indicating the number of bits for realizing the above embodiments and exemplary embodiments. Those having been described will not be described in detail. As used herein, the term "module" may implement a combination of software and/or hardware of a predetermined function. Although the device described in the following embodiments are preferably implemented in software, the implementation of hardware, or a combination of software and hardware, is also possible and conceivable.

FIG. 6 is a structure block diagram of the first device for indicating the number of bits according to an embodiment of the present disclosure. As shown in FIG. 6, the device is applied to a transmitter UE side. The first device 60 for indicating the number of bits includes a first indicating module 62. The first indication module 62 will be described below.

The first indication module 62 is arranged to indicate the number k of effective indication bits in a bitmap sequence. In the embodiment, the bitmap sequence indicates PSSCH subframes allocation, k includes one or multiple values, 1≤k≤N, and N is a bit length of the entire bitmap sequence.

The first indication module 62 may be arranged to indicate the number k of the effective indication bits via a high layer signaling and/or a physical layer signaling.

The first indication module 62 may be arranged to indicate the number k of the effective indication bits in at least one of the following manners. The UE indicates the number k of the effective indication bits via a broadcast message for D2D communication. The UE indicates the number k of the effective indication bits via a SCI between a transmitter terminal and a receiver terminal of D2D communication.

The first indication module 62 is further arranged to execute at least one of the following processing. When the UE indicates the number k of the effective indication bits via the broadcast message for D2D communication, one or multiple k values are indicated by the broadcast message which is carried on a PSBCH resource. When the UE indicates the number k of the effective indication bits via the SCI between the transmitter terminal and the receiver terminal of D2D communication, one or multiple k values are indicated by n bits in the SCI, where n is equal to 1 or 2 or 3. When the UE indicates the number k of the effective indication bits via the SCI, one k value is indicated by n1 bits in indication bits corresponding to a TRP, and a bitmap pattern is indicated by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In an exemplary embodiment, a TRP indicates a bitmap pattern through a 7-bit index. Each of TRP indexes corresponds to one bitmap pattern. The TRP indexes indicate all or part of bitmap patterns corresponding to one or multiple k values.

The TRP indexes sequentially indicate all or part of the bitmaps corresponding to different k values in accordance with the multiple k values when the TRP indexes indicate all or part of the bitmaps corresponding to the multiple k values.

FIG. 7 is a structure block diagram of the second device for indicating the number of bits according to an embodiment of the present disclosure. As shown in FIG. 7, the device is applied to a network entity side. The second device 70 for indicating the number of bits includes a second indicating module 72. The second indication module 72 will be described below.

The second indication module 72 is arranged to indicate the number k of effective indication bits in a bitmap sequence. In the embodiment, the bitmap sequence indicates PSSCH subframes allocation, k includes one or multiple values, 1≤k≤N, and N is a bit length of the entire bitmap sequence.

The second indication module 72 is arranged to indicate the number k of the effective indication bits via a high layer signaling and/or a physical layer signaling.

The second indication module 72 may be arranged to indicate the number k of the effective indication bits in at least one of the following manners. The network entity indicates the number k of the effective indication bits via a SIB. The network entity indicates the number k of the effective indication bits via a RRC message. The network entity indicates the number k of the effective indication bits via a sidelink resource scheduling control signaling.

The second indication module 72 is further arranged to execute at least one of the following processing. When the network entity indicates the number k of the effective indication bits via the SIB, one or multiple k values, which are indicated via the SIB, are effective for all D2D UEs within a cell. When the network entity indicates the number k of the effective indication bits via the SIB, one or multiple k values, which are indicated via the SIB, are effective for UEs within a designated D2D group. When the network entity indicates the number k of the effective indication bits via the RRC message, one or multiple k values are indicated by the RRC message which is embodied as a D2D reconfiguration message of a D2D-specific configuration indication message. When the network entity indicates the number k of the effective indication bits in the sidelink resource scheduling control signaling, one or multiple k values are indicated by n bits contained in the sidelink resource scheduling control signaling in a DCI format, where n is equal to 1 or 2 or 3. When the network entity indicates the number k of the effective indication bits via DCI, the network entity indicates one k value by n1 bits in the indication bits corresponding to a TRP, and indicates a bitmap pattern by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In an exemplary embodiment, a TRP indicates a bitmap pattern through a 7-bit index. Each of TRP indexes corresponds to one bitmap pattern. The TRP indexes indicate all or part of bitmap patterns corresponding to one or multiple k values.

The TRP indexes sequentially indicate all or part of the bitmaps corresponding to different k values in accordance with the multiple k values when the TRP indexes indicate all or part of the bitmaps corresponding to the multiple k values.

The network entity includes at least one of: an eNB, a RN, a MCE, a GW, a MME, an EUTRAN, and an OAM manager.

Figure 8:
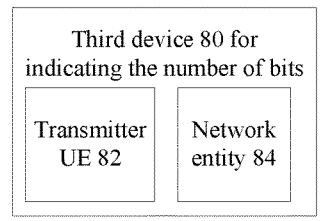
FIG. 8 is a structure block diagram of the third device for indicating the number of bits according to an embodiment of the present disclosure.

FIG. 8 is a structure block diagram of the third device for indicating the number of bits according to an embodiment of the present disclosure. As shown in FIG. 8, the device is applied to a system. The third device 80 for indicating the number of bits includes: a transmitter UE 82 and a network entity 84. The device will be described below.

The transmitter UE 82 and the network entity 84 are arranged to indicate the number k of effective indication bits in a bitmap sequence. In the embodiment, the bitmap sequence indicates PSSCH subframes allocation, k includes one or multiple values, 1≤k≤N, and N is a bit length of the entire bitmap sequence.

The transmitter UE and the network entity are arranged to indicate the number k of the effective indication bits via a high layer signaling and/or a physical layer signaling.

The transmitter UE and the network entity may be arranged to indicate the number k of the effective indication bits via a high layer signaling and a physical layer signaling in at least one of the following manners. The network entity indicates the number k of the effective indication bits via a SIB, and the UE indicates the number k of the effective indication bits via a broadcast message for D2D communication. The network entity indicates the number k of the effective indication bits via the SIB, and the UE indicates the number k of the effective indication bits via a Sidelink Control Information (SCI) between a transmitter terminal and a receiver terminal of D2D communication. The network entity indicates the number k of the effective indication bits via a RRC message, and the UE indicates the number k of the effective indication bits via a broadcast message for D2D communication. The network entity indicates the number k of the effective indication bits via the RRC message, and the UE indicates the number k of the effective indication bits via the SCI. The network entity indicates the number k of the effective indication bits via a sidelink resource scheduling control signaling, and the UE indicates the number k of the effective indication bits via a broadcast message for D2D communication. The network entity indicates the number k of the effective indication bits via the sidelink resource scheduling control signaling, and the UE indicates the number k of the effective indication bits via the SCI.

When the UE indicates the number k of the effective indication bits via the broadcast message for D2D communication, one or multiple k values are indicated by the broadcast message which is carried on a PSBCH resource. When the UE indicates the number k of the effective indication bits via the SCI between the transmitter terminal and the receiver terminal of D2D communication, one or multiple k values are indicated by n bits in the SCI, where n is equal to 1 or 2 or 3. When the UE indicates the number k of the effective indication bits via the SCI, one k value is indicated by n1 bits in indication bits corresponding to a TRP, and a bitmap pattern is indicated by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7. When the network entity indicates the number k of the effective indication bits via the SIB, one or multiple k values, which are indicated via the SIB, are effective for all D2D UEs within a cell. When the network entity indicates the number k of the effective indication bits via the SIB, one or multiple k values, which are indicated via the SIB, are effective for UEs within a designated D2D group. When the network entity indicates the number k of the effective indication bits via the RRC message, one or multiple k values are indicated by the RRC message which is embodied as a D2D reconfiguration message of a D2D-specific configuration indication message. When the network entity indicates the number k of the effective indication bits in the sidelink resource scheduling control signaling, one or multiple k values are indicated by n bits contained in the sidelink resource scheduling control signaling in a DCI format, where n is equal to 1 or 2 or 3. When the network entity indicates the number k of the effective indication bits via DCI, the network entity indicates one k value by n1 bits in the indication bits corresponding to a TRP, and indicates a bitmap pattern by a bitmap index represented by n2 bits in the indication bits corresponding to the TRP, each bitmap index uniquely corresponds to one bitmap pattern, and the bitmap index indicates all or part of bitmap patterns corresponding to the one k value, where n1=1 or 2 or 3, and n1+n2=7.

In an exemplary embodiment, a TRP indicates a bitmap pattern through a 7-bit index. Each of TRP indexes corresponds to one bitmap pattern. The TRP indexes indicate all or part of bitmap patterns corresponding to one or multiple k values.

The TRP indexes sequentially indicate all or part of the bitmaps corresponding to different k values in accordance with the multiple k values when the TRP indexes indicate all or part of the bitmaps corresponding to the multiple k values.

The network entity includes at least one of: an eNB, a RN, a MCE, a GW, a MME, an EUTRAN, and an OAM manager.

In order to solve the problem in the related art that the flexibility of TRP bitmap sequence is limited and the TRP indication overhead is limited, a method and a device for configuring a data resource are provided in the embodiments of the present disclosure. The method and device can indicate the number k of effective indication bits of a bitmap sequence in the TRP bitmap sequence via the physical layer and/or the high layer control signaling. By virtue of the technical scheme, efficient, flexible and high adaptable data resource configuration indications can be provided, and resource configuration is provided to meet the demands of D2D communication services, thereby improving the configuration flexibility of D2D data resources and improving resource utilization.

The embodiments of present disclosure are described below with reference to the drawings in detail so that the purpose, the technical solution and advantages of the embodiments of the present disclosure are more clearly understood. It is important to note that the embodiments of the present application and the characteristics in the embodiments may be combined under the condition of no conflicts.

The network side may include one or more of: an eNB, a RN, a MCE, a GW, a MME, an EUTRAN, and an OAM manager. The eNB will be described below as a configuration control entity of the network side.

In the D2D communication system, the system uplink subframes are used as the PSSCH subframes. The D2D transmitter UE having D2D data to be transmitted can obtain the PSSCH subframe configuration from the eNB; or the D2D transmitter UE selects certain subframes as PSSCH subframes in the system predefined resource pool. The eNB configures and indicates the PSSCH subframes to the transmitter UE, or the transmitter UE indicates the used PSSCH subframes to the receiver UE. The used PSSCH subframes are indicated by using the TRP. The eNB uses a D2D resource scheduling indication specific control information format, i.e., DCI format 5, to indicate the TRP to the transmitter UE. The transmitter UE indicates the TRP in the sidelink (i.e., D2D link) control information (SCI).

Figure 9:
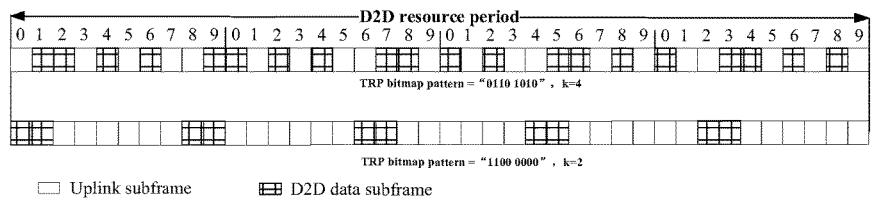
FIG. 9 is a schematic diagram of indicating PSSCH subframe allocation via a TRP bitmap pattern in a D2D communication in a related art.

FIG. 9 is a schematic diagram of indicating PSSCH subframe allocation via a TRP bitmap pattern in a D2D communication according to an embodiment of the present disclosure. As shown in FIG. 9, the TRP contains 7-bit indication information. Each TRP index corresponds to a unique bitmap pattern. Each bitmap pattern has a length of N, where N=6, 7, 8. The bitmap pattern has k effective indication bits, that is, bits labelled as "1" in the bitmap pattern. For example, "11110000" is a bitmap pattern of N=8, k=4. According to the bitmap pattern indicated by TRP, the corresponding subframe whose bit is labelled as "1" is indicated as the PSSCH subframe. The bitmap sequence is adopted for mapping circularly in the entire D2D resource cycle to achieve the subframe configuration indication during the entire cycle.

In the bitmap pattern indicated by the TRP, the value of the number k of effective indication bits may be indicated by the eNB and/or the transmitter UE through the high layer signaling and/or physical layer signaling configuration (as described above for determining the number k of the effective indication bits). The indicated k may include one or more specific values. The method for indicating the number k of the effective indication bits may include at least the following methods.

1. The eNB indicates k through a SIB message.

The eNB indicates the number k of effective indication bits of a bitmap sequence in the TRP in the D2D communication in the cell through a SIB message (also referred to as the system broadcast message). In such a case, the number k of the effective indication bits indicated in the SIB is a cell level configuration parameter. That is, this number k is valid uniformly for all the D2D UEs in the cell. Alternatively, the SIB may also configure the number k of the effective indication bits according to different D2D UE groups. The number k of the configuration indication may be valid uniformly for the UEs belonging to the corresponding D2D groups. The configured k value may include one or more specific values, 1≤k≤N.

2. The eNB indicates k through a RRC message,

The eNB indicates the number k of effective indication bits of a bitmap sequence in the TRP through a RRC message. The RRC message is UE level configuration indication information, and the number k of the effective indication bits can be independently configured and indicated for each UE. The indicated k value may be valid only for the transmitter UE receiving the RRC message. The RRC message for configuring and indicating the number k of the effective indication bits may also be a D2D communication specific configuration indication message (e.g., D2DReconfiguration). The configured k value may include one or more specific values, 1≤k≤N.

3. The eNB indicates k through a dedicated indication bit in a D2D dedicated DCI.

The eNB indicates the number k of effective indication bits of a bitmap sequence in the TRP through a D2D dedicated DCI. The configured k value may include one or more specific values, 1≤k≤N. The dedicated indication bit defined in the DCI is used to indicate the number k of the effective indication bits, and the dedicated overhead contains n bits, indicating one k value or a set of k values, n=1 or 2 or 3.

4. The transmitter UE indicates k through a D2D broadcast message.

The transmitter UE indicates the number k of effective indication bits of a bitmap sequence in the TRP in a D2D broadcast message. The configured k value may include one or more specific values, 1≤k≤N. The D2D broadcast message is carried on the PSBCH resource so that the receiver UE can obtain, by receiving the PSBCH, the configuration of the k value used for the transmitter UE.

5. The transmitter UE indicates k through a SCI.

The transmitter UE indicates the number k of effective indication bits of a bitmap sequence in the TRP through a SCI. The configured k value may include one or more specific values, 1≤k≤N. The dedicated indication bit defined in the SCI is used to indicate the number k of the effective indication bits, and the dedicated overhead contains n bits, indicating one k value or a set of k values, n=1 or 2 or 3.

6. The eNB or the transmitter UE indicates the number k of the effective indication bits through n1 bits in a TRP 7-bit overhead.

When the eNB indicates the number k of the effective indication bits through the D2D dedicated DCI, or when the transmitter UE indicates the number k of the effective indication bits through the SCI, n1 bits in the 7-bit TRP indication overhead in the DCI or SCI may be adopted to indicate the unique k value, and n2 bits in the 7-bit TRP indication overhead in the DCI or SCI may be adopted to indicate the bitmap pattern under this k value, N1=1 or 2 or 3, n1+n2=7.

In addition, under the condition of no conflicts, the above method for indicating the k value may also be used in combination, and some examples are listed below.

In a first example, the eNB indicates the number k of the effective indication bits through the SIB, and the transmitter UE indicates the number k of the effective indication bits through the PSBCH.

Figure 10:
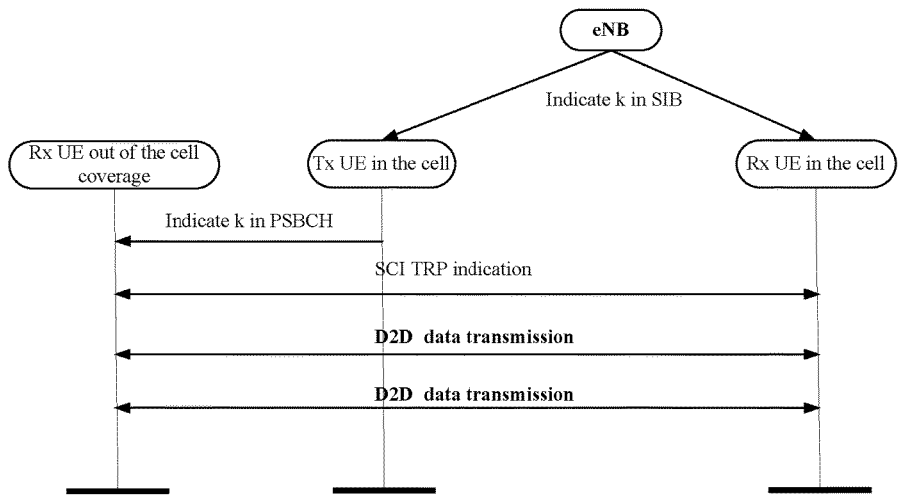
FIG. 10 is a diagram of a signaling flow the network-side configuring the number k of the effective indication bits via the SIB message and the transmitter UE forwarding via the PSBCH according to the embodiment of the present disclosure.

Specifically, the eNB indicates the k value configuration for all D2D UEs in the cell through the SIB message. The configured k value may include one or more specific values, 1≤k≤N. The transmitter UE can forward the configuration of the eNB to k on the PSBCH resource so that the D2D UE out of the cell coverage can obtain the configuration information to keep the parameter configuration consistent with the D2D UE in the cell. By virtue of the solution, the effect of coordinating the control of D2D resources, avoiding the resource conflict, and reducing signal interference can be achieved. The signaling flow is as shown in FIG. 10. FIG. 10 is a diagram of a signaling flow the network-side configuring the number k of the effective indication bits via the SIB message and the transmitter UE forwarding via the PSBCH according to the embodiment of the present disclosure.

In a second example, the eNB indicates the number k of the effective indication bits through the SIB, and the transmitter UE indicates the number k of the effective indication bits by TRP.

Specifically, the eNB indicates the k value configuration for all D2D UEs in the cell through the SIB message. The configured k value may include one or more specific values, 1≤k≤N. The transmitter UE further indicates one k value in the TRP indication bit in the SCI, and the indicated specific k value belongs to one of the multiple k values. In this way, the secondary configuration method, in which one or multiple k values are configured by the eNB and the transmitter UE selects one k value from the one or multiple k values, achieves the effect of semi-statically and dynamically adjusting the k value configuration. In this way, the TRP bitmap pattern based on the TR value has a higher configuration flexibility so as to adapt to service demands and network demands, and achieve the effect of making full use of network resources and improving resource utilization and so on.

In a third example, the eNB indicates the number k of the effective indication bits through the RRC, and the transmitter UE indicates the number k of the effective indication bits through the PSBCH.

Figure 11:
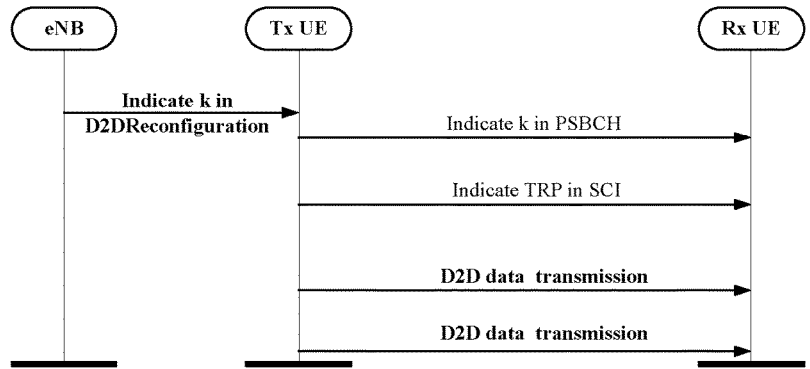
FIG. 11 is a diagram of a signaling flow the network-side configuring the number k of the effective indication bits via the RRC message and the transmitter UE forwarding via the PSBCH according to the embodiment of the present disclosure.

Specifically, eNB indicates the k value configuration to the transmitter UE through the RRC message, and the configured k value may include one or more specific values, 1≤k≤N. The transmitter UE further forwards, on the PSBCH resource, the configuration of the eNB for the number k of the effective indication bits so that the receiver terminal D2D UE can obtain the configuration information to keep the uniform bitmap pattern indication relationship with the transmitter UE. By virtue of the solution, the effect of semi-statically adjusting the k value configuration can be achieved, so that the TRP bitmap pattern based on the TR value has a higher configuration flexibility to adapt to service demands and network demands. In addition, the effect of making full use of network resources and improving resource utilization and so on can be achieved. The signaling flow is as shown in FIG. 11. FIG. 11 is a diagram of a signaling flow the network-side configuring the number k of the effective indication bits via the RRC message and the transmitter UE forwarding via the PSBCH according to the embodiment of the present disclosure.

In a fourth example, the eNB indicates the number k of the effective indication bits through the RRC, and the transmitter UE indicates the number k of the effective indication bits through the SCI.

Figure 12:
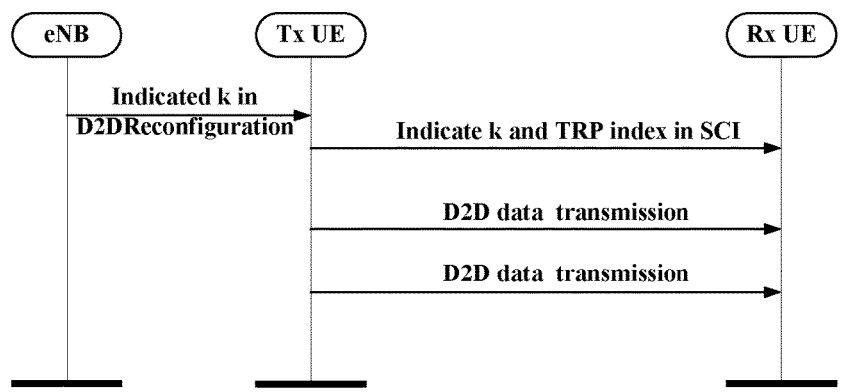
FIG. 12 is a diagram of a signaling flow the network-side configuring the number k of the effective indication bits via the RRC message and the transmitter UE indicating the number k of the effective indication bits via the SCI according to the embodiment of the present disclosure.

Specifically, the eNB indicates the k value configuration to the transmitter UE through the RRC message, and the configured k value includes one or more specific values, 1≤k≤N. The transmitter UE further indicates one k value through a dedicated indication in the SCI, and the indicated specific k value belongs to one of the multiple k values configured by the eNB. In this way, the secondary configuration method, in which one or multiple k values are configured by the eNB and the transmitter UE selects one k value from the one or multiple k values, achieves the effect of semi-statically and dynamically adjusting the k value configuration. In this way, the TRP bitmap pattern based on the TR value has a higher configuration flexibility so as to adapt to service demands and network demands, and the effect of making full use of network resources and improving resource utilization and so on can be achieved. The signaling flow is as shown in FIG. 12. FIG. 12 is a diagram of a signaling flow the network-side configuring the number k of the effective indication bits via the RRC message and the transmitter UE indicating the number k of the effective indication bits via the SCI according to the embodiment of the present disclosure.

In a fifth example, the eNB indicates the number k of the effective indication bits through the DCI, and the transmitter UE indicates the number k of the effective indication bits through the TRP.

Figure 13:
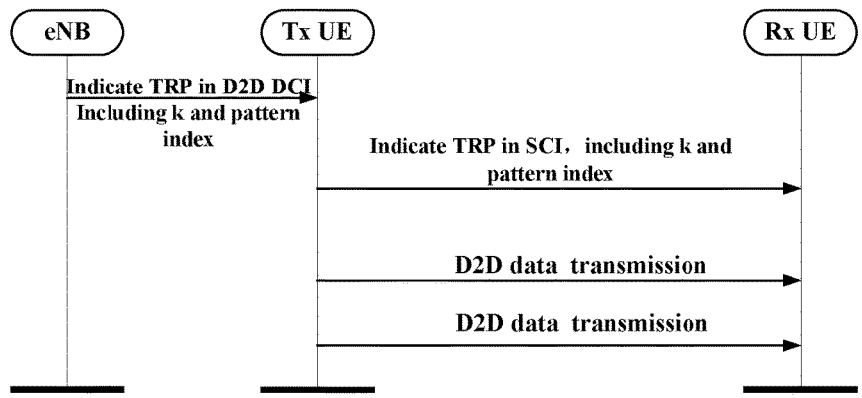
FIG. 13 is a diagram of a signaling flow the network-side configuring the number k of the effective indication bits via physical layer signaling and the transmitter UE indicating the number k of the effective indication bits via TRP according to an embodiment of the present disclosure.

Specifically, the eNB configures the 7-bit TRP indication to the transmitter UE via the D2D DCI signaling, where n1 bits indicate a unique k value and n2 bits indicate a bitmap pattern under this k value. The transmitter UE also uses TRP to indicate a unique k value in the SCI and the pattern index corresponding to this k value. The number k of the effective indication bits can be flexibly and dynamically configured by the eNB through the DCI, achieving the effect of dynamically adjusting the k value configuration. In this way, the TRP bitmap pattern based on the TR value has a higher configuration flexibility so as to adapt to service demands and network demands, and the effect of making full use of network resources and improving resource utilization and so on can be achieved. The signaling flow is as shown in FIG. 13. FIG. 13 is a diagram of a signaling flow the network-side configuring the number k of the effective indication bits via physical layer signaling and the transmitter UE indicating the number k of the effective indication bits via TRP according to an embodiment of the present disclosure.

When multiple k values are indicated by the above method, the 7-bit TRP indexes indicated by the eNB in the DCI or by the transmitter UE in the SCI correspond to all or part of the bit patterns corresponding to the plurality of indicated k values, respectively. The TRP indexes correspond to the corresponding bitmap patterns in the order of k values, and each TRP index only indicates one bitmap pattern.

The method for indicating the number k of the effective indication bits is described below in connection with the specific embodiments.

Embodiment 1: TRP Index and Indicated Corresponding Bitmap Pattern

The eNB configures and indicates the number k of the effective indication bits through the SIB message, k=[1, 2, 4, 8], and N=8. After the D2D UE in the cell receives the SIB message, the k value configuration is obtained, and the corresponding relationship between the TRP index indication and the bitmap pattern is further determined based on the configured k value, as shown in Table 1. Table 1 a table that indicates the corresponding relationship between the TRP index indication and the bitmap pattern. TRP index 0 to index 7 indicate the bitmap pattern corresponding to k=1. TRP index 8 to index 35 indicate the bitmap pattern corresponding to k=2. TRP index 36 to index 105 indicate the bitmap pattern corresponding to k=4. TRP index 106 indicates indicate the bitmap pattern corresponding to k=8.

Based on the configuration of the k value in the SIB, if the eNB indicates TRP index=15 to the transmitter UE through the DCI, the transmitter UE obtains the bitmap pattern "00010010" according to the k value of the SIB configuration and the corresponding relationship between the corresponding TRP index and the bitmap pattern, and further determines the PSSCH subframe configured by the eNB according to the bitmap pattern. Optionally, if the transmitter UE indicates TRP index=15 in the SCI, the receiver UE also determines the bitmap pattern corresponding to the TRP index=15 based on the k value configuration, and receives the D2D data transmitted by the transmitter UE on the corresponding PSSCH subframe.

TABLE 1

| TRP index | Bitmap pattern |
| --- | --- |
| 0 | 10000000 |
| 1 | 01000000 |
| 2 | 00100000 |
| 3 | 00010000 |
| 4 | 00001000 |
| 5 | 00000100 |
| 6 | 00000010 |
| 7 | 00000001 |
| 8 | 00000011 |
| 9 | 00000101 |
| 10 | 00000110 |
| 11 | 00001001 |
| 12 | 00001010 |
| 13 | 00001100 |
| 14 | 00010001 |
| 15 | 00010010 |
| 16 | 00010100 |
| 17 | 00011000 |
| 18 | 00100001 |
| 19 | 00100010 |
| 20 | 00100100 |
| 21 | 00101000 |
| 22 | 00110000 |
| 23 | 01000001 |
| 24 | 01000010 |
| 25 | 01000100 |
| 26 | 01001000 |
| 28 | 01100000 |
| 29 | 10000001 |
| 30 | 10000010 |
| 31 | 10000100 |
| 32 | 10001000 |
| 33 | 10010000 |
| 34 | 10100000 |
| 35 | 11000000 |
| 36 | 00001111 |
| 37 | 00010111 |
| 38 | 00011011 |
| 39 | 00011101 |
| 40 | 00011110 |
| 41 | 00100111 |
| 42 | 00101011 |
| 43 | 00101101 |
| 44 | 00101110 |
| 45 | 00110011 |
| 46 | 00110101 |
| 47 | 00110110 |
| 48 | 00111001 |
| 49 | 00111010 |
| 50 | 00111100 |
| 51 | 01000111 |
| 52 | 01001011 |
| 53 | 01001101 |
| 54 | 01001110 |
| 55 | 01010011 |
| 56 | 01010101 |
| 57 | 01010110 |
| 58 | 01011001 |
| 59 | 01011010 |
| 60 | 01011100 |
| 61 | 01100011 |
| 62 | 01100101 |
| 63 | 01100110 |
| 64 | 01101001 |
| 65 | 01101010 |
| 66 | 01101100 |
| 67 | 01110001 |
| 68 | 01110010 |
| 69 | 01110100 |
| 70 | 01111000 |
| 71 | 10000111 |
| 72 | 10001011 |
| 73 | 10001101 |
| 74 | 10001110 |
| 75 | 10010011 |
| 76 | 10010101 |
| 77 | 10010110 |
| 78 | 10011001 |
| 79 | 10011010 |
| 80 | 10011100 |
| 81 | 10100011 |
| 82 | 10100101 |
| 83 | 10100110 |
| 84 | 10101001 |
| 85 | 10101010 |
| 86 | 10101100 |
| 87 | 10110001 |
| 88 | 10110010 |
| 89 | 10110100 |
| 90 | 10111000 |
| 91 | 11000011 |
| 92 | 11000101 |
| 93 | 11000110 |
| 94 | 11001001 |
| 95 | 11001010 |
| 96 | 11001100 |
| 97 | 11010001 |
| 98 | 11010010 |
| 99 | 11010100 |
| 100 | 11011000 |
| 101 | 11100001 |
| 102 | 11100010 |
| 103 | 11100100 |
| 104 | 11101000 |
| 105 | 11110000 |
| 106 | 11111111 |

Embodiment 2: The eNB configures the number k of the effective indication bits through the RRC information, and the transmitter UE indicates the number k of the effective indication bits through the PSBCH.

The eNB configures and indicates the number k of the effective indication bits to the transmitter UE through the D2D Reconfiguration message, k=[1, 2, 3, 4] and N=8. The transmitter UE determines the corresponding relationship between the TRP index and the bitmap pattern according to the number k of the effective indication bits. Since the number of all bitmap patterns corresponding to k=[1, 2, 3, 4] is 162, exceeding the range of 128 patterns which can be indicated by the 7 bits TRP at most, when k=[1, 2, 3, 4], TRP index can only indicate part of the bitmap patterns corresponding to the number k of the effective indication bits. When k is configured as [1, 2, 3, 4], the corresponding table between the TRP index and the bitmap pattern should be determined in accordance with the predefined rules. The first 128 patterns are taken in the order of the k value to form a corresponding relationship, as shown in Table 2. Table 2 is a corresponding table between the TRP index and the bitmap pattern. TRP index 0 to index 7 indicate the bitmap pattern corresponding to k=1. TRP index 8 to index 35 indicate the bitmap pattern corresponding to k=2. TRP index 36 to index 91 indicate the bitmap pattern corresponding to k=3. TRP index 92 to index 127 indicate the bitmap pattern corresponding to k=4. The corresponding bitmap patterns when k=4 are part of the available patterns, rather than all the available bitmap patterns of k=4.

If the transmitter UE forwards the k value configuration indicated by the eNB on the PSBCH channel resource, the receiver UE obtains the k configuration by receiving the PSBCH, and can determine the corresponding relationship between the TRP index and the bitmap pattern according to the same rule.

If the eNB indicates, to the transmitter UE, TRP index=75 through the DCI, the transmitter UE obtains the bitmap pattern "00110001" according to the corresponding relationship between the k value and the corresponding TRP index and the bitmap pattern, and determines the PSSCH subframe configured by the eNB according to the bitmap pattern. Optionally, if the transmitter UE indicates TRP index=75 in the SCI, the receiver UE also determines the bitmap pattern corresponding to the TRP index=75 based on the k value configuration and receives the D2D data transmitted by the transmitter UE on the corresponding PSSCH subframe.

TABLE 2

| TRP index | Bitmap pattern |
|---|---|
| 0 | 10000000 |
| 1 | 01000000 |
| 2 | 00100000 |
| 3 | 00010000 |
| 4 | 00001000 |
| 5 | 00000100 |
| 6 | 00000010 |
| 7 | 00000001 |
| 8 | 11000000 |
| 9 | 10100000 |
| 10 | 10010000 |
| 11 | 10001000 |
| 12 | 10000100 |
| 13 | 10000010 |
| 14 | 10000001 |
| 15 | 01100000 |
| 16 | 01010000 |
| 17 | 01001000 |
| 18 | 01000100 |
| 19 | 01000010 |
| 20 | 01000001 |
| 21 | 00110000 |
| 22 | 00101000 |
| 23 | 00100100 |
| 24 | 00100010 |
| 25 | 00100001 |
| 26 | 00011000 |
| 27 | 00010100 |
| 28 | 00010010 |
| 29 | 00010001 |
| 30 | 00001100 |
| 31 | 00001010 |
| 32 | 00001001 |
| 33 | 00000110 |
| 34 | 00000101 |
| 35 | 00000011 |
| 36 | 11100000 |
| 37 | 11010000 |
| 38 | 11001000 |
| 39 | 11000100 |
| 40 | 11000010 |
| 41 | 11000001 |
| 42 | 10110000 |
| 43 | 10101000 |
| 44 | 10100100 |
| 45 | 10100010 |
| 46 | 10100001 |
| 47 | 10011000 |
| 48 | 10010100 |
| 49 | 10010010 |
| 50 | 10010001 |
| 51 | 10001100 |
| 52 | 10001010 |
| 53 | 10001001 |
| 54 | 10000110 |
| 55 | 10000101 |
| 56 | 10000011 |
| 57 | 01110000 |
| 58 | 01101000 |
| 59 | 01100100 |
| 60 | 01100010 |
| 61 | 01100001 |
| 62 | 01011000 |
| 63 | 01010100 |
| 64 | 01010010 |
| 65 | 01010001 |
| 66 | 01001100 |
| 67 | 01001010 |
| 68 | 01001001 |
| 69 | 01000110 |
| 70 | 01000101 |
| 71 | 01000011 |
| 72 | 00111000 |
| 73 | 00110100 |
| 74 | 00110010 |
| 75 | 00110001 |
| 76 | 00101100 |
| 77 | 00101010 |
| 78 | 00101001 |
| 79 | 00100110 |
| 80 | 00100101 |
| 81 | 00100011 |
| 82 | 00011100 |
| 83 | 00011010 |
| 84 | 00011001 |
| 85 | 00010110 |
| 86 | 00010101 |
| 87 | 00010011 |
| 88 | 00001110 |
| 89 | 00001101 |
| 90 | 00001011 |
| 91 | 00000111 |
| 92 | 11110000 |
| 93 | 11101000 |
| 94 | 11100100 |
| 95 | 11100010 |
| 96 | 11100001 |
| 97 | 11011000 |
| 98 | 11010100 |
| 99 | 11010010 |
| 100 | 11010001 |
| 101 | 11001100 |
| 102 | 11001010 |
| 103 | 11001001 |
| 104 | 11000110 |
| 105 | 11000101 |
| 106 | 11000011 |
| 107 | 10111000 |
| 108 | 10110100 |
| 109 | 10110010 |
| 110 | 10110001 |
| 111 | 10101100 |
| 112 | 10101010 |
| 113 | 10101001 |
| 114 | 10100110 |
| 115 | 10100101 |
| 116 | 10100011 |
| 117 | 10011100 |
| 118 | 10011010 |
| 119 | 10011001 |
| 120 | 10010110 |
| 121 | 10010101 |
| 122 | 10010011 |
| 123 | 10001110 |
| 124 | 10001101 |
| 125 | 10001011 |
| 126 | 10000111 |
| 127 | 01111000 |

Embodiment 3: The eNB indicates the number k of the effective indication bits in the DCI TRP, and the transmitter UE indicates the number k of the effective indication bits in the SCI TRP.

The eNB and the transmitter UE use n1 (n1=3) bits to indicate the unique k value in the 7-bit indication overhead of the TRP, and use the remaining n2 (n2=4) bits to indicate the corresponding bitmap pattern under this k value. In this example, n1=3, eight k values can be indicated at most, k=[1, 2, 3, 4, 5, 6, 7, 8]. In this example, n2=4, which means that corresponding to each k value, 16 bitmap patterns can be indicated at most.

If TRP bitmap has a length of N=7, when k=1, 6, 7, the number of all available bitmap patterns is not greater than 16, therefore n2 bits can indicate all bitmap patterns corresponding to k. When k=2, 3, 4, 5, the number of bitmap patterns corresponding to each k value is greater than 16, therefore n2 bits can only indicate part of the bitmap patterns corresponding to k. Therefore, the bitmap pattern indicated corresponding to the corresponding index should be defined. No more than 16 bitmap patterns are selected from all available bitmap patterns, which has a one-to-one correspondence with the pattern index indicated by the n2 bits. For example, the first 16 bitmap patterns in all available bitmap patterns are used to form a corresponding relationship with the pattern index, as shown in Table 3 to Table 9. Table 3 to Table 9 are corresponding tables between the pattern index and the bitmap pattern.

As an example, eNB indicates the 7-bit indication overhead of the TRP as "1000101" in the DCI to the transmitter UE. The first 3 bits indicate k=5 and the last 4 bits indicate pattern index=5. It can be seen from Table 7 that the indicated bitmap pattern is "1110011". The transmitter UE obtains the PSSCH subframe configured by the eNB according to the bitmap pattern. Optionally, if the transmitter UE indicates TRP in the SCI as "1000101", the receiver UE also obtains the corresponding PSSCH subframe indication in accordance with the above rule and receives the D2D data transmitted by the transmitter UE on the PSSCH subframe.

TABLE 3 k = 1

| pattern index | Bitmap pattern |
|---|---|
| 0 | 1000000 |
| 1 | 0100000 |
| 2 | 0010000 |
| 3 | 0001000 |
| 4 | 0000100 |
| 5 | 0000010 |
| 6 | 0000001 |

TABLE 4 k = 2

| pattern index | Bitmap pattern |
|---|---|
| 0 | 1100000 |
| 1 | 1010000 |
| 2 | 1001000 |
| 3 | 1000100 |
| 4 | 1000010 |
| 5 | 1000001 |
| 6 | 0110000 |
| 7 | 0101000 |
| 8 | 0100100 |
| 9 | 0100010 |
| 10 | 0100001 |
| 11 | 0011000 |
| 12 | 0010100 |
| 13 | 0010010 |
| 14 | 0010001 |
| 15 | 0001100 |

TABLE 5 k = 3

| pattern index | Bitmap pattern |
|---|---|
| 0 | 1110000 |
| 1 | 1101000 |
| 2 | 1100100 |
| 3 | 1100010 |
| 4 | 1100001 |
| 5 | 1011000 |
| 6 | 1010100 |
| 7 | 1010010 |
| 8 | 1010001 |
| 9 | 1001100 |
| 10 | 1001010 |
| 11 | 1001001 |
| 12 | 1000110 |
| 13 | 1000101 |
| 14 | 1000011 |
| 15 | 1110000 |

TABLE 6 k = 4

| pattern index | Bitmap pattern |
|---|---|
| 0 | 1111000 |
| 1 | 1110100 |
| 2 | 1110010 |
| 3 | 1110001 |
| 4 | 1101100 |
| 5 | 1101010 |
| 6 | 1101001 |
| 7 | 1100110 |
| 8 | 1100101 |
| 9 | 1100011 |
| 10 | 1011100 |
| 11 | 1011010 |
| 12 | 1011001 |
| 13 | 1010110 |
| 14 | 1010101 |
| 15 | 1111000 |

TABLE 7 k = 5

| pattern index | Bitmap pattern |
|---|---|
| 0 | 1111100 |
| 1 | 1111010 |
| 2 | 1111001 |
| 3 | 1110110 |
| 4 | 1110101 |
| 5 | 1110011 |
| 6 | 1101110 |
| 7 | 1101101 |
| 8 | 1101011 |
| 9 | 1100111 |
| 10 | 1011110 |
| 11 | 1011101 |
| 12 | 1011011 |
| 13 | 1010111 |
| 14 | 1001111 |
| 15 | 0111110 |

TABLE 8 k = 6

| pattern index | Bitmap pattern |
|---|---|
| 0 | 1111110 |
| 1 | 1111101 |
| 2 | 1111011 |
| 3 | 1110111 |
| 4 | 1101111 |
| 5 | 1011111 |
| 6 | 0111111 |

TABLE 9 k = 7

| pattern index | Bitmap pattern |
|---|---|
| 0 | 111111 |

Embodiment 4: The transmitter UE selects k, informs in the PSBCH, and indicates the specifically used k value in the SCI with the dedicated indication bit.

The transmitter UE freely selects the resources for the D2D data transmission within the system predefined resource pool. The transmitter UE selects the number k of the effective indication bits according to its own service demands and the predefined resource pool configuration and indicates one or multiple k values on the PSBCH channel resources.

In the embodiment of the present disclosure, if the transmitter UE indicates the actually used k value in 1 or 2 or 3 bit dedicated indication overhead in the SCI and indicates the bitmap pattern in the TRP, then the 7-bit overhead of the TRP under the indication of different k values corresponds to different indication relationship between the TRP indexes and the bitmap patterns. Since the TRP index has a 7-bit overhead, all the bitmap patterns can be indicated for any k values, as shown in Table 10 to Table 12. Table 10 to Table 12 are tables that indicate the relationship between the TRP index and the bitmap pattern.

The transmitter UE indicates k=[1, 3, 5] in the PSBCH, and N=6. During actual resource scheduling and indication, the transmitter UE indicates the use of the second value of the available k values in 2 bits in the SCI, that is, k=3. The TRP index is indicated as "0001101" in the TRP. It can be seen from Table 11 that the indicated bitmap pattern is "010110". The transmitter UE transmits the D2D data on the PSSCH subframe indicated by the bitmap pattern. The receiver UE also obtains the corresponding PSSCH subframe indication according to the above rule by receiving the PSBCH and the SCI, and receives the D2D data transmitted from the transmitter UE on the PSSCH subframe.

TABLE 10 k = 1

| TRP index | Bitmap pattern |
|---|---|
| 0 | 100000 |
| 1 | 010000 |
| 2 | 001000 |
| 3 | 000100 |
| 4 | 000010 |
| 5 | 000001 |

TABLE 11 k = 3

| TRP index | Bitmap pattern |
|---|---|
| 0 | 111000 |
| 1 | 110100 |
| 2 | 110010 |
| 3 | 110001 |
| 4 | 101100 |
| 5 | 101010 |
| 6 | 101001 |
| 7 | 100110 |
| 8 | 100101 |
| 9 | 100011 |
| 10 | 011100 |
| 11 | 011010 |
| 12 | 011001 |
| 13 | 010110 |
| 14 | 010101 |
| 15 | 010011 |
| 16 | 001110 |
| 17 | 001101 |
| 18 | 001011 |
| 19 | 000111 |

TABLE 12 k = 5

| TRP index | Bitmap pattern |
|---|---|
| 0 | 111110 |
| 1 | 111101 |
| 2 | 111011 |
| 3 | 110111 |
| 4 | 101111 |
| 5 | 011111 |

Obviously, those skilled in the art should know that each module or step of the embodiment of the present disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, and, in some cases, the steps shown or described may be performed in a order different from the order herein, or the modules or steps may form each integrated circuit module, or multiple modules or steps therein may form a single integrated circuit module for implementation. As a consequence, the present disclosure is not limited to any specific hardware and software combination.

The above is only the exemplary embodiment of the present disclosure and not intended to limit the present disclosure, and for the technician of the field, the present disclosure may have various modifications and variations. Any modifications, equivalent replacements, improvements and the like within the principle of the present disclosure shall fall within the scope of protection as defined in the appended claims of the present disclosure.

INDUSTRIAL APPLICABILITY

As described above, the above-described embodiments and exemplary embodiments solve the problem in the related art of low flexibility in D2D PSSCH subframe configuration. By virtue of the technical scheme, the effect of increased flexibility of D2D PSSCH subframe configuration and increased resource utilization rate can be achieved.

What is claimed is:

1. A method for indicating number of bits, comprising:
determining, by a transmitting User Equipment (UE) and/or a network entity, a number k of effective indication bits in a bitmap sequence;
indicating, by the transmitting User Equipment (UE) and/or the network entity, the number k of effective indication bits in the bitmap sequence, wherein the bitmap sequence indicates Physical Sidelink Shared Channel (PSSCH) subframes allocation, k comprises one or multiple values, 1≤k≤N, and N is a bit length of the entire bitmap sequence;
wherein indicating, by the transmitting UE and/or the network entity, the number k of the effective indication bits comprises: indicating, by the network entity and/or the transmitting UE, the number k of the effective indication bits via a high layer signaling and/or a physical layer signaling.

2. The method as claimed in claim 1, wherein indicating, by the transmitting UE and/or the network entity, the number k of the effective indication bits via the high layer signaling and/or the physical layer signaling comprises at least one of the following manners:
indicating, by the UE, the number k of the effective indication bits via a broadcast message for Device-to-Device (D2D) communication;
indicating, by the UE, the number k of the effective indication bits via a Sidelink Control Information (SCI) between a transmitter terminal and a receiver terminal of D2D communication;
indicating, by the network entity, the number k of the effective indication bits via a System Information Block (SIB);
indicating, by the network entity, the number k of the effective indication bits via a Radio Resource Control (RRC) message; and
indicating, by the network entity, the number k of the effective indication bits via a sidelink resource scheduling control signaling.

3. The method as claimed in claim 2, wherein indicating, by the transmitting UE and/or the network entity, the number k of the effective indication bits via the high layer signaling and/or the physical layer signaling comprises at least one of:
when the UE indicates the number k of the effective indication bits via the broadcast message for D2D communication, indicating one or multiple k values by the broadcast message which is carried on a Physical Sidelink Broadcast Channel (PSBCH) resource;
when the UE indicates the number k of the effective indication bits via the SCI between the transmitter terminal and the receiver terminal of D2D communication, indicating one or multiple k values by n bits in the SCI, where n is equal to 1 or 2 or 3;
when the UE indicates the number k of the effective indication bits via the SCI, indicating one k value by n1 bits in indication bits corresponding to a Time Resource Pattern (TRP), and indicating a bitmap pattern by a bitmap index represented by n2 bits in the indication bits corresponding to the TRP, wherein each bitmap index uniquely corresponds to one bitmap pattern, and the bitmap index indicates all or part of bitmap patterns corresponding to the one k value, where n1=1 or 2 or 3, and n1+n2=7;
when the network entity indicates the number k of the effective indication bits via the SIB, one or multiple k values, which are indicated via the SIB, being effective for all D2D UEs within a cell;
when the network entity indicates the number k of the effective indication bits via the SIB, one or multiple k values, which are indicated via the SIB, being effective for UEs within a designated D2D group;
when the network entity indicates the number k of the effective indication bits via the RRC message, indicating one or multiple k values by the RRC message which is embodied as a D2D reconfiguration message of a D2D-specific configuration indication message;
when the network entity indicates the number k of the effective indication bits in the sidelink resource scheduling control signaling, indicating one or multiple k values by n bits contained in the sidelink resource scheduling control signaling in a Downlink Control Information (DCI) format, where n is equal to 1 or 2 or 3; and
when the network entity indicates the number k of the effective indication bits via DCI, indicating, by the network entity, one k value by n1 bits in the indication bits corresponding to a TRP, and indicating a bitmap pattern by a bitmap index represented by n2 bits in the indication bits corresponding to the TRP, wherein each bitmap index uniquely corresponds to one bitmap pattern, and the bitmap index indicates all or part of bitmap patterns corresponding to the one k value, where n1=1 or 2 or 3, and n1+n2=7.

4. The method as claimed in claim 1, wherein
a Time Resource Pattern (TRP) indicates a bitmap pattern through a 7-bit index, each of TRP indexes corresponds to one bitmap pattern, and the TRP indexes indicate all or part of bitmap patterns corresponding to one or multiple k values.

5. The method as claimed in claim 1, wherein
the TRP indexes sequentially indicate all or part of the bitmaps corresponding to different k values in accordance with the multiple k values when the TRP indexes indicate all or part of the bitmaps corresponding to the multiple k values.

6. The method as claimed in claim 1, wherein the network entity comprises at least one of:
an evolved NodeB (eNB), a Relay Station (RN), a Multi-cell/multicast Coordination Entity (MCE), a Gateway (GW), a Mobility Management Equipment (MME), an Evolved Universal Terrestrial Radio Access Network (EUTRAN), and an Operation Administration Maintenance (OAM) manager.

7. A device for indicating number of bits, applied to a transmitting User Equipment (UE) side, comprising a hardware processor configured to execute program modules stored on a memory, wherein the device is configured to determine a number k of effective indication bits in a bitmap sequence, and the program modules comprise:
a first indicating module, arranged to indicate the number k of effective indication bits in the bitmap sequence, wherein the bitmap sequence indicates Physical Sidelink Shared Channel (PSSCH) subframes allocation, k comprises one or multiple values, 1≤k≤N, and N is a bit length of the entire bitmap sequence;
wherein the first indicating module is arranged to indicate the number k of the effective indication bits via a high layer signaling and/or a physical layer signaling.

8. The device as claimed in claim 7, wherein the first indicating module is arranged to indicate the number k of the effective indication bits in at least one of the following manners:
    indicating, by the UE, the number k of the effective indication bits via a broadcast message for Device-to-Device (D2D) communication; and
    indicating, by the UE, the number k of the effective indication bits via a Sidelink Control Information (SCI) between a transmitter terminal and a receiver terminal of D2D communication.

9. The device as claimed in claim 8, wherein the first indicating module is further arranged to execute at least one of the following processing:
    when the UE indicates the number k of the effective indication bits via the broadcast message for D2D communication, indicating one or multiple k values by the broadcast message which is carried on a Physical Sidelink Broadcast Channel (PSBCH) resource;
    when the UE indicates the number k of the effective indication bits via the SCI between the transmitter terminal and the receiver terminal of D2D communication, indicating one or multiple k values by n bits in the SCI, where n is equal to 1 or 2 or 3; and
    when the UE indicates the number k of the effective indication bits via the SCI, indicating one k value by n1 bits in indication bits corresponding to a Time Resource Pattern (TRP), and indicating a bitmap pattern by a bitmap index represented by n2 bits in the indication bits corresponding to the TRP, wherein each bitmap index uniquely corresponds to one bitmap pattern, and the bitmap index indicates all or part of bitmap patterns corresponding to the one k value, where n1=1 or 2 or 3, and n1+n2=7.

10. The device as claimed in claim 7, wherein
    a Time Resource Pattern (TRP) indicates a bitmap pattern through a 7-bit index, each of TRP indexes corresponds to one bitmap pattern, and the TRP indexes indicate all or part of bitmap patterns corresponding to one or multiple k values.

11. The device as claimed in claim 7, wherein
    the TRP indexes sequentially indicate all or part of the bitmaps corresponding to different k values in accordance with the multiple k values when the TRP indexes indicate all or part of the bitmaps corresponding to the multiple k values.

12. A device for indicating number of bits, applied to a network entity side, comprising a hardware processor configured to execute program modules stored on a memory, wherein the device is configured to determine a number k of effective indication bits in a bitmap sequence, and the program modules comprise:
    a second indicating module, arranged to indicate the number k of effective indication bits in the bitmap sequence, wherein the bitmap sequence indicates Physical Sidelink Shared Channel (PSSCH) subframes allocation, k comprises one or multiple values, 1≤k≤N, and N is a bit length of the entire bitmap sequence;
    wherein the second indicating module is arranged to indicate the number k of the effective indication bits via a high layer signaling and/or a physical layer signaling.

13. The device as claimed in claim 12, wherein the second indicating module is arranged to indicate the number k of the effective indication bits in at least one of the following manners:
    indicating, by the network entity, the number k of the effective indication bits via a System Information Block (SIB);
    indicating, by the network entity, the number k of the effective indication bits via a Radio Resource Control (RRC) message; and
    indicating, by the network entity, the number k of the effective indication bits via a sidelink resource scheduling control signaling.

14. The device as claimed in claim 13, wherein the second indicating module is further arranged to execute at least one of the following processing:
    when the network entity indicates the number k of the effective indication bits via the SIB, one or multiple k values, which are indicated via the SIB, being effective for all D2D UEs within a cell;
    when the network entity indicates the number k of the effective indication bits via the SIB, one or multiple k values, which are indicated via the SIB, being effective for UEs within a designated D2D group;
    when the network entity indicates the number k of the effective indication bits via the RRC message, indicating one or multiple k values by the RRC message which is embodied as a D2D reconfiguration message of a D2D-specific configuration indication message;
    when the network entity indicates the number k of the effective indication bits in the sidelink resource scheduling control signaling, indicating one or multiple k values by n bits contained in the sidelink resource scheduling control signaling in a Downlink Control Information (DCI) format, where n is equal to 1 or 2 or 3; and
    when the network entity indicates the number k of the effective indication bits via DCI, indicating, by the network entity, one k value by n1 bits in the indication bits corresponding to a TRP, and indicating a bitmap pattern by a bitmap index represented by n2 bits in the indication bits corresponding to the TRP, wherein each bitmap index uniquely corresponds to one bitmap pattern, and the bitmap index indicates all or part of bitmap patterns corresponding to the one k value, where n1=1 or 2 or 3, and n1+n2=7.

15. The device as claimed in claim 12, wherein
    a Time Resource Pattern (TRP) indicates a bitmap pattern through a 7-bit index, each of TRP indexes corresponds to one bitmap pattern, and the TRP indexes indicate all or part of bitmap patterns corresponding to one or multiple k values.

16. The device as claimed in claim 12, wherein
    the TRP indexes sequentially indicate all or part of the bitmaps corresponding to different k values in accordance with the multiple k values when the TRP indexes indicate all or part of the bitmaps corresponding to the multiple k values.

17. The device as claimed in claim 12, wherein the network entity comprises at least one of:
    an evolved NodeB (eNB), a Relay Station (RN), a Multi-cell/multicast Coordination Entity (MCE), a Gateway (GW), a Mobility Management Equipment (MME), an Evolved Universal Terrestrial Radio Access Network (EUTRAN), and an Operation Administration Maintenance (OAM) manager.

* * * * *